United States Patent
Helwig et al.

(10) Patent No.: US 6,889,481 B2
(45) Date of Patent: May 10, 2005

(54) APPARATUS FOR PROCESSING CONTINUOUSLY FED ELONGATE MATERIAL

(75) Inventors: Christian Helwig, Huettenberg (DE); Thomas Matheyka, Eppstein (DE)

(73) Assignee: CMD Corporation, Appleton, WI (US)

( * ) Notice: Subject to any disclaimer, the term of this patent is extended or adjusted under 35 U.S.C. 154(b) by 60 days.

(21) Appl. No.: 10/827,180

(22) Filed: Apr. 19, 2004

(65) Prior Publication Data

US 2004/0194434 A1 Oct. 7, 2004

Related U.S. Application Data

(63) Continuation of application No. 10/279,512, filed on Oct. 23, 2002, which is a continuation of application No. 09/458,694, filed on Dec. 13, 1999, now abandoned.

(30) Foreign Application Priority Data

Dec. 11, 1998 (DE) ...................................... 298 22 122 U
Oct. 27, 1999 (EP) .............................................. 99120874

(51) Int. Cl.[7] .............................................. B65B 51/10
(52) U.S. Cl. ...................... 53/373.7; 53/374.6; 53/375.9
(58) Field of Search ............................ 53/374.5, 373.7, 53/374.6, 375.4, 376.2, 375.9

(56) References Cited

U.S. PATENT DOCUMENTS

| 4,663,917 A | 5/1987 | Taylor et al. |
|---|---|---|
| 4,947,618 A | 8/1990 | Schneider |
| 5,191,750 A | 3/1993 | Kammier |
| 5,753,067 A | 5/1998 | Fukuda et al. |
| 5,848,517 A | 12/1998 | Yamamoto et al. |
| 5,946,884 A | 9/1999 | Nordstrom et al. |
| 5,966,909 A | 10/1999 | Kammier et al. |
| 6,138,442 A | * 10/2000 | Howard et al. ................ 53/477 |
| 6,178,726 B1 | 1/2001 | Takigawa |

FOREIGN PATENT DOCUMENTS

| DE | A2 2401800 | 7/1975 |
|---|---|---|
| DE | A3 4005078 | 8/1991 |
| EP | A3 0469819 | 2/1992 |
| EP | A4 0666215 | 8/2002 |
| FR | A1 2446172 | 8/1980 |
| GB | 2052372 | * 1/1981 |
| GB | A2 2052372 | 1/1981 |
| GB | A4 2271753 | 4/1994 |
| JP | 405065144 | 3/1993 |

* cited by examiner

Primary Examiner—Eugene Kim
(74) Attorney, Agent, or Firm—George R. Corrigan

(57) ABSTRACT

Apparatus for processing continuously fed elongate material, such as forming sealed bags from continuously fed film tubes, uses at least one pair of orbital tools that are cantilevered from tool drives (e.g., crank arms) at one edge of the material, extending transversely across the direction of material travel to engage opposite faces of the material. During material engagement the tools run synchronously with the moving material, but may be returned upstream rapidly to reengage the material for the next processing cycle. In order to achieve a higher throughput an additional pair of tools can be used, cantilevered and driven from the opposite edge of the material, maintaining the same processing (e.g., sealing) time. Through this arrangement the tools on opposing sides can alternate contact with the material and be run independently of each other.

6 Claims, 2 Drawing Sheets

APPARATUS FOR PROCESSING CONTINUOUSLY FED ELONGATE MATERIAL

RELATED APPLICATIONS

This is a continuation of, and claims the benefit of the filing date of, U.S. patent application Ser. No. 10/279,512, filed on Oct. 23, 2002, entitled Apparatus For Processing Continuously Fed Elongated Material, which is a continuation of U.S. patent application Ser. No. 09/458,694, filed on Dec. 13, 1999 now abandoned, entitled Apparatus For Processing Continuously Fed Elongated Material, now abandoned.

TECHNICAL FIELD

The invention relates to apparatus for the processing of continuously fed material with tools which act on the material intermittently. Such apparatus is used, for example, in the production of filled bags made from an elongate film tube which is welded or glued at discrete locations to form the ends of the bags and seal in their contents. The film material typically is made of a thermoplastic foil which can be sealed by the application of pressure and heat or adhesive.

BACKGROUND ART

Depending on bag length, tools (e.g., sealing jaws) typically used in such apparatus extend perpendicularly of the film feed direction and intermittently flatten and glue or weld the film tube, using heat and pressure to form the ends of the bags. To allow adequate time for the heated sealing jaws to act on the packaging material so that the film tube is sealed to form the bag ends, the sealing jaws must travel at the same speed as the film tube, and must return to the advancing film upstream by one bag length after each welding or gluing operation.

This return travel can be achieved through the known use of a mechanism in the form of paddle wheels having the sealing jaws mounted at the tips of the paddles. The paddle wheels rotate at such a rate that the travel (tangential) speed of the sealing jaws coincides with the film feed speed.

Another known arrangement for the return travel of the sealing jaws by one bag length after each welding operation consists of a mechanism which retracts the sealing jaws from the film through a cam arrangement or an articulated joint. The sealing jaws are then returned in a straight-line or orbital path to the position of the next welding line and from this point move synchronously with the film for the required sealing time.

The paddle wheel-type sealing mechanism significantly limits throughput speed because of the required contact (sealing) time of the sealing jaws, and because return of the sealing jaws upstream to the start position requires more time than the filling of a bag, thus requiring the film feed to be slowed or stopped. Similar problems exist with other types of known sealing mechanisms. If it is desired to increase the film feed speed for the same packaging material (which would require the same sealing time), it would be necessary to increase the length (stroke) of the sealing operation, which in turn would also prolong the time for return travel of the sealing jaws.

SUMMARY OF THE INVENTION

It is, therefore, an object of the invention to provide apparatus for processing continuously fed elongate material which would permit a substantial increase in the throughput of processed material, while maintaining the required time for the synchronous movement of the processing tools when in contact with the processed material on which they act.

This and other objects are achieved in one aspect of the invention by providing an improved apparatus for processing elongate material continuously advancing along a processing path by using at least a first pair of cyclically driven tools between which the material passes as it moves along the processing path and which synchronously engage opposite faces of the material and move at the same linear speed as the material when in contact therewith, and return upstream to re-engage the advancing material and repeat the processing cycle, the improvement wherein each tool is cantilevered transversely of the processing path from a tool drive located adjacent a first edge of the processing path.

Another aspect of the invention involves an improved apparatus for processing elongate material as aforesaid, wherein the material is an elongate film tube.

A further aspect of the invention involves an improved bag forming and filling apparatus which forms bags, dispenses product into the bags and seals them, the bags being formed from an elongate film tube and processed by sealing tools as aforesaid.

In each of these aspects of the invention, the tool drive for each tool supports the tool for orbital movement around a drive axis that extends transversely of the processing path. Each tool is mounted on a tool carrier which is supported by the tool drive and has a tool carrier axis about which the tool carrier rotates, the tool carrier axis orbiting around its respective drive axis. Preferably, the tool carrier axis and the drive axis are parallel.

Preferably the tools are spring-mounted on the tool carriers, which affords necessary compliance to allow the orbit of the tool to flatten somewhat during contact with the material, and apply proper force to the material.

It is also possible to mount processing tools at an angle to their tool carriers such that the processing can occur at angles other than 90° to the direction of material movement. Through such an arrangement, e.g., bag shapes can be produced which have sloped seams.

Each tool drive comprises a crank arm having a drive end and a free end, each tool carrier is cantilevered at the free end of its respective crank arm, the drive end of the crank arm is supported for rotation about the drive axis. Preferably, all of the tool carrier axes and the drive axes are parallel.

Each tool has a working face adapted to engage the material, and the tool drives maintain the working faces of the tools in a mutually facing attitude throughout revolution of the tool carriers about their respective drive axes. To achieve this, each crank arm is rotatably driven at its drive end by a drive shaft which is journaled for rotation relative to a fixed shaft coaxial with the drive shaft and the drive axis. The tool carrier has a carrier shaft journaled for rotation at the free end of the crank arm for rotation about the tool carrier axis. A timing mechanism operatively interconnects the carrier shaft and the fixed shaft to effect counter-rotation of the carrier shaft relative to the crank arm at the same angular rate so that the attitude of the tool relative to the processing path is fixed. The timing mechanism may comprise an endless member, e.g. a toothed belt, which interconnects the carrier shaft and the fixed shaft.

The swivel connection between the tool carrier and the crank arm also simplifies pneumatic, electrical and other connections to the tool. Without the swivel connection, the tool would undergo a constant winding motion about the drive axis (as in prior art paddle wheel-type sealing machines), thus requiring rotary couplings for air, electricity, etc. With the swivel connection, direct flexible supply lines may be used which only undergo an orbital motion dictated by the length of the crank arm.

The cantilevered tool arrangement substantially frees up space in the processing area. Thus, and further according to the invention, a second pair of similarly driven tools may be provided to perform the same or a different function in opposition to the first pair. The second pair of tools is similarly supported in cantilevered fashion, but from tool drives located adjacent a second (opposite) edge of the processing path.

The second pair of tools may be located at the same longitudinal position along the processing path as the first pair of tools. In that case the drive axes for each set of two tools which act on the same face of the material are coaxial so that those two tools travel in the same orbital path, the first and second pairs of tools being synchronously operated out of phase so that they engage the material at different times and do not interfere with each other. Alternatively, the two pairs of tools may be located at different positions along the processing path. In either case, the first and second pairs of tools are operated independently, e.g. by separate servomotors.

If the two pairs of tool carriers are equipped with identical tools, the throughput of the apparatus may be doubled without increasing the speed of the dual drives. If each pair of tool carriers is equipped with different tools, two different operations can be executed in the processing area in the same cycle. In addition to sealing, these may include, e.g., stripping, cutting, and perforating.

In many known processing arrangements, the drive systems are designed such that the tools move in identical orbits at the same speed. This invention allows the choice of unequal drive systems because the second pair of tools can rotate at different radii and thus can effect a different operation at different distances as compared to, e.g., the sealing operation performed by the first pair of tools.

It is advantageous to have independent control of the tool drives. When the tool is withdrawn from the processed material, independent control makes it possible to shorten the cycle time significantly by more rapid tool repositioning upstream to the next contact point on the material, allowing an increase in throughput. Independent control also provides flexibility in adjusting tool motion, and in the case of dual pairs of tools insures that unwanted tool interference will not occur.

Apparatus according to the invention can be used to process any type of elongate material by means of one or more pairs of processing tools mounted in cantilevered fashion as described above.

BRIEF DESCRIPTION OF THE DRAWINGS

The invention will be described and the mode of operation of the invention will be explained by way of example in the following detailed description of a preferred embodiment (best mode) taken in conjunction with the accompanying drawings, in which.

DETAILED DESCRIPTION OF THE INVENTION

Figure 1:
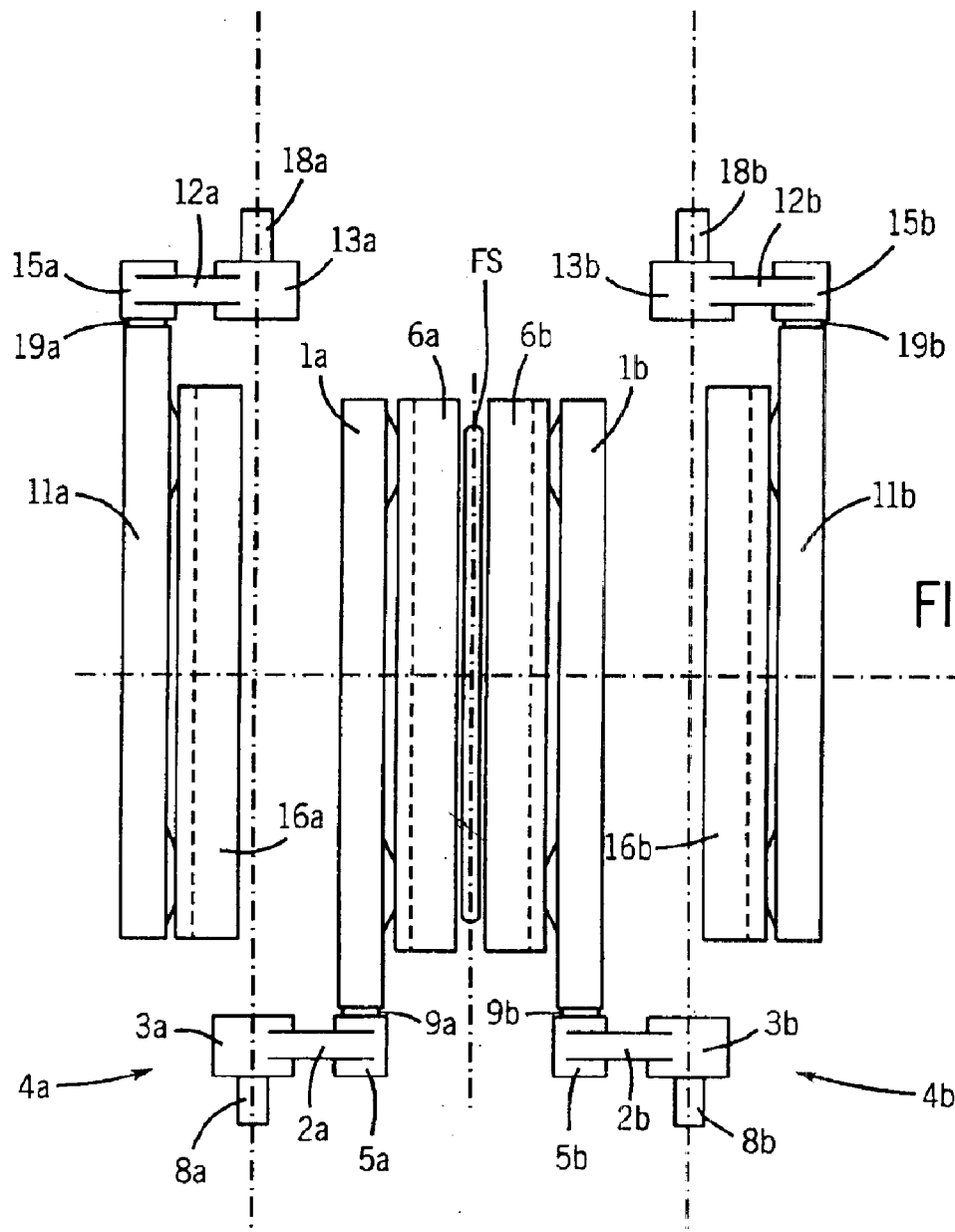
FIG. 1 is a schematic top plan view showing the basics of the main components of an apparatus according to the invention for the processing of a moving film tube FS (viewed endwise in section) for the manufacture of bags, at the point where a pair of tools are opening after completing the sealing cycle.
Figure 2:
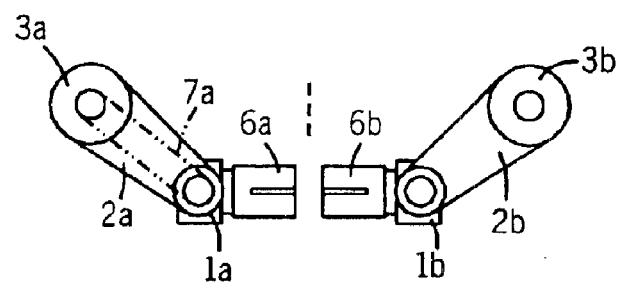
FIG. 2 is a side elevational view of the same components, where the film tube is omitted for clarity.

Referring to FIGS. 1 and 2, a first pair of sealing tools 6a, 6b are shown which have just parted contact with the opposite faces of a film tube FS. Tube FS is shown in sectional end view in FIG. 1, moving away from the viewer and into the plane of the figure. Tools 6a, 6b are resiliently mounted on tool carriers 1a, 1b, respectively, as explained in more detail below. Tool carriers 1a, 1b are cantilevered from tool drives 4a, 4b, respectively, located adjacent one edge of the processing path along which tube FS moves, such that the tools 6a, 6b extend perpendicularly and on opposite sides of the processing path.

Tool drive 4a comprises a hollow crank arm 2a rigidly connected to or formed with shaft 3a at its drive end, and having an integrally formed head 5a at its free end. A stub shaft 9a is rigidly attached to tool carrier 1a and is journaled in head 5a for pivoting movement relative to crank arm 2a about a tool carrier axis. Shaft 3a is journaled on fixed shaft 8a for rotation about a drive axis. The drive axis and the tool carrier axis are parallel. The other tool drive 4b of this first pair comprises similar, mirror-image components denoted in the figures by like b-series reference numerals. Shafts 3a, 3b are synchronously driven in counter-rotating fashion, shaft 3a rotating clockwise as seen in FIG. 2 and shaft 3b rotating counterclockwise.

The length of crank arms 2a, 2b determines the radius of the orbits of tools 6a, 6b about shafts 8a, 8b. The orbit radius together with the angular speed of the shafts 3a, 3b determine the duration of an operating cycle during which the tools 6a, 6b close to weld the tubular film FS, and are opened and repositioned upstream to start another sealing operation.

Figure 4A:
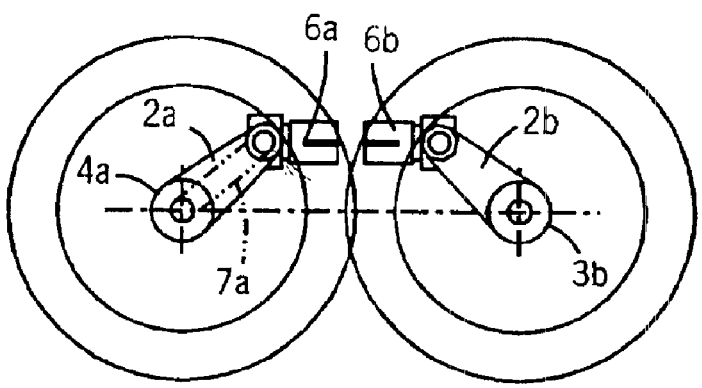
FIGS. 4a–4d show in schematic form the functional sequence of a pair of tool carriers during a working cycle.
Figure 4B:
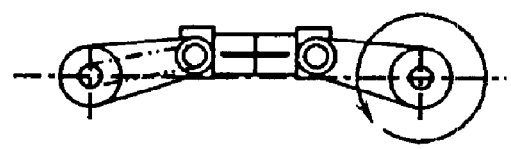
Figure 4C:
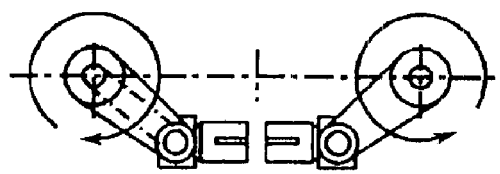
Figure 4D:
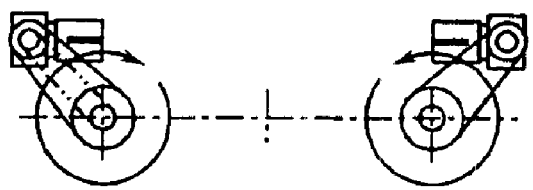

FIGS. 4a through 4d explain the motion sequence of the cantilevered tool pair 1a, 1b. During the machine cycle, shaft 3a turns clockwise, while shaft 3b turns counterclockwise. In FIG. 4a the tools are shown just before closing onto the film tube (not shown). As the cycle progresses (FIG. 4b), tools 6a, 6b are pressed toward each other and against the film tube. The tools 6a, 6b are resiliently supported on tool carriers 1a, 1b by means of well-known, linear-acting spring-loaded plungers (not shown) located in the tool carriers 1a, 1b. The intrinsic circular path of tools 6a, 6b is flattened in the processing area by the compression stroke of the plungers. This results in parallel pressure, which acts on the total working surfaces of tools 6a, 6b. In the position shown in FIG. 4c, the pressure on the film tube has terminated as the tools 6a, 6b begin to move apart. Crank arms 2a, 2b can now move at high speed through the position shown in FIG. 4d and back to the initial position shown in FIG. 4a.

Figure 3:
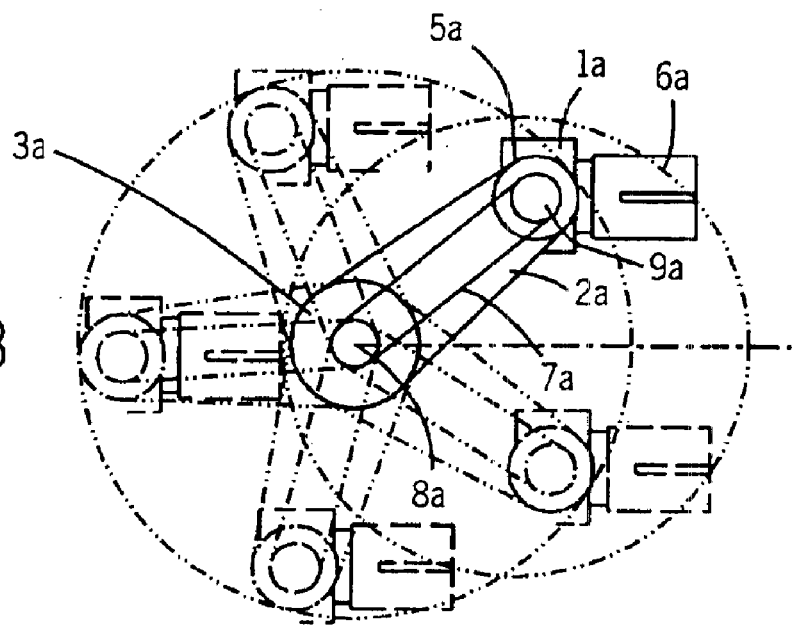
FIG. 3 is a schematic detail view of the operation of a tool carrier, including the tool, during a working cycle, showing the interior of the crank arm.

The mutually facing attitude of the working faces of tools 6a, 6b is maintained by the mechanism depicted in solid lines in FIG. 3, which shows only tool 6a and its tool drive. An identical arrangement is provided for tool 6b. Within hollow crank arm 2a is a belt 7a, preferably a toothed timing belt (flat or V-shaped), that interconnects fixed shaft 8a and stub shaft 9a (to which tool carrier 1a is rigidly attached). Shaft 8a and stub shaft 9a are notched (not shown) so as to mate with the teeth on timing belt 7a. As shaft 3a rotates clockwise through the various positions shown in broken lines, the motion imparted to timing belt 7a in contact with fixed shaft 8a causes stub shaft 9a and, hence, tool carrier 1a to rotate counterclockwise at the same rate as shaft 3a as it orbits around shaft 8a. This maintains the tool 6a at a constant attitude, as shown, so that its working face is always properly positioned. Alternatives to a toothed timing belt could include any type of non-slip coupling, such as a chain and mating sprockets, or a gear train.

The cantilevered tool arrangement from one edge of the processing path allows easy access to the tools 6a, 6b and simplified connection of utilities to the tools. Instead of rotary couplings for air, electrical current and other heating media, it is possible with the arrangement of the invention to employ direct flexible supply lines (not shown) to the ends of the tools adjacent their drives, which lines need only move through an orbit dictated by the length of crank arms 2a, 2b.

The cantilevered tool arrangement also allows for installation of a second pair of similarly driven tools which are cantilevered from tool drives located adjacent the opposite edge of the processing path. The second pair of tools can perform the same function as the first pair, or a different function, such as cutting, perforating, stripping, gluing or labeling.

If identical pairs of tools are to be used which are to act on the moving material in the same rhythm, a second mirror-image arrangement would be used with aligned (coaxial) drive axes for each set of tools which act on the same face of the material. This second pair of tools 16a, 16b with their drive mechanisms are shown in FIG. 1, with like parts identified with like reference numerals to which 10 has been added. Shown in this example are two sets of like tools (6a, 16a and 6b, 16b), which are mounted 180 degrees out of phase on their coaxial drive shafts (8a, 18a and 8b, 18b) such that, while the first pair of tools (6a, 6b) is on its return stroke, the second oppositely cantilevered pair of tools (16a, 16b) goes through its active work phase, and vice versa. With this dual arrangement, it is possible to increase the throughput significantly.

It is possible to use one pair of tools for other operations. Because of the degree of freedom afforded by the cantilevered arrangement, it is possible to use tools with different timing. Using servomotors, the drives can be controlled so as to make collisions of the tools impossible, even if they travel on identical, even overlapping orbits at different rotational speeds. Because of the short time associated with a rapid return stroke, it is possible to produce bags which are shorter than the distance required for their formation.

Accessories and modifications will be apparent to those skilled in the art. A so-called "stripper" can be attached to the tools and tool carriers, respectively, freely projecting from the crank arms, which strips off product in the seal area by means of two opposing bar-type parts traveling in the same direction, shortly before the tools close the film tube for sealing. An angular mount of the tools on the tool carriers will result in an oblique seam in the formed bags. Other modifications can be made without departing from the true scope of the invention, which is limited only by the appended claims.

The disclosures of German patent application No. 298 22 122.5, filed 11 Dec. 1998, and European patent application No. 99120874.5, filed 27 Oct. 1999, are incorporated herein by reference in their entirety.

What is claimed is:

1. An apparatus for processing elongate material continuously advancing along a processing path, comprising:

at least a first pair of cyclically driven tools following an orbital movement, between which the material passes as it moves along the processing path, and which synchronously engage opposite faces of the material during a portion of the orbital movement and move at the same linear speed as the material when in contact therewith, and return upstream along the orbital movement to re-engage the advancing material and repeat the processing cycle, wherein each tool is cantilevered on a near end transversely of the processing path from a tool drive located adjacent a near edge of the processing path and further wherein the tool drive for each tool supports the tool for orbital movement around a drive axis that extends transversely of the processing path such that the orbital movement forms a circle; and a pair of passive devices effective during a portion of the orbital movement, each located near a distal end of one of the pair of tools, to affect the position of the distal end.

2. The apparatus of claim 1, wherein the pair of passive devices is effective during at least all of the portion of the orbital movement.

3. The apparatus of claim 2, wherein the pair of passive devices is effective during at least the time the material is engaged.

4. The apparatus of claim 3, wherein the pair of passive devices includes a spring.

5. The apparatus of claim 4, further comprising a second pair of opposing passive devices, each mounted near the near end of each tool carrier, effective during at least part of the portion of the orbital movement, wherein the second pair of passive devices affects the path of the pair of tools mounted on the carrier.

6. The apparatus of claim 5, further comprising a second pair of cyclically driven tools following a second orbital movement, between which the material passes as it moves along the processing path, and which synchronously engage opposite faces of the material during a portion of the second orbital movement and move at the same linear speed as the material when in contact therewith, and return upstream along the second orbital movement to re-engage the advancing material and repeat the processing cycle, wherein each of the second pair of tools is out of phase with the first pair, and cantilevered on the distal end of the second pair transversely of the processing path from a second tool drive located adjacent the distal edge of the processing path and further wherein the second tool drive for each second pair of tools second drive axis that extends transversely of the processing path such that the orbital movement forms a circle, and a third pair of passive devices effective during a portion of the second orbital movement, each located near the near distal end of one of the second pair of tools, to affect the position of the near end.

* * * * *